United States Patent
Tohyama et al.

(10) Patent No.: US 10,094,428 B2
(45) Date of Patent: Oct. 9, 2018

(54) FRICTION PLATE AND WET MULTIPLE-PLATE CLUTCH WITH FRICTION PLATE

(71) Applicant: NSK-WARNER K.K., Shinagawa-ku, Tokyo (JP)

(72) Inventors: Kazuyuki Tohyama, Fukuroi (JP); Hidetoshi Maeda, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 0 days.

(21) Appl. No.: 14/720,600

(22) Filed: May 22, 2015

(65) Prior Publication Data

US 2015/0362023 A1    Dec. 17, 2015

(30) Foreign Application Priority Data

Jun. 11, 2014 (JP) ................................. 2014-120249

(51) Int. Cl.
  *F16D 13/72* (2006.01)
  *F16D 13/64* (2006.01)
  *F16D 69/00* (2006.01)

(52) U.S. Cl.
  CPC .......... *F16D 13/72* (2013.01); *F16D 13/648* (2013.01); *F16D 69/00* (2013.01); *F16D 2069/004* (2013.01)

(58) Field of Classification Search
  CPC . F16D 13/74; F16D 13/648; F16D 2065/1312
  See application file for complete search history.

(56) References Cited

U.S. PATENT DOCUMENTS

| 3,171,527 | A | * | 3/1965 | Ott | F16D 13/64 188/264 A |
| 6,499,579 | B2 | * | 12/2002 | Ono | F16D 13/74 192/113.36 |
| 7,234,580 | B2 | | 6/2007 | Li et al. | |
| 7,958,984 | B2 | * | 6/2011 | Kobayashi | F16D 13/64 192/107 R |
| 2001/0023803 | A1 | * | 9/2001 | Hattori | F16D 25/064 |

(Continued)

FOREIGN PATENT DOCUMENTS

| JP | 63-014032 U | 1/1988 |
| JP | 2001-295859 A | 10/2001 |

(Continued)

OTHER PUBLICATIONS

Office Action dated Apr. 25, 2017, in Chinese Patent Application No. 201510288754.6.

(Continued)

*Primary Examiner* — Jacob S. Scott
*Assistant Examiner* — Lillian T Nguyen
(74) *Attorney, Agent, or Firm* — Shapiro, Gabor and Rosenberger, PLLC (57) ABSTRACT

A friction plate is formed by circularly fixing a plurality of friction material segments to a substantially annular core plate. A through groove that penetrates from an inside diameter side to an outside diameter side of the core plate is formed between the friction material segments, and each of the friction material segments has a circumferential groove that opens to the through groove, extends in a circumferential direction, and terminates in the friction material segment.

12 Claims, 6 Drawing Sheets

(56) References Cited

U.S. PATENT DOCUMENTS

| | | | | |
|---|---|---|---|---|
| 2005/0217965 A1* | 10/2005 | Muranaka | ............... | F16D 13/64 |
| | | | | 192/113.36 |
| 2005/0224310 A1* | 10/2005 | Li | ........................ | F16D 13/64 |
| | | | | 192/113.36 |
| 2012/0325614 A1* | 12/2012 | Yamashita | ............. | F16H 45/02 |
| | | | | 192/70.14 |
| 2013/0153358 A1* | 6/2013 | Chavdar | ............... | F16D 13/644 |
| | | | | 192/70.14 |
| 2013/0168199 A1 | 7/2013 | Higashijima et al. | | |

FOREIGN PATENT DOCUMENTS

| | | |
|---|---|---|
| JP | 2002-081463 A | 3/2002 |
| JP | 2005-265186 A | 9/2005 |
| JP | 2007-051759 A | 3/2007 |
| JP | 2008-175354 A | 7/2008 |
| WO | WO 2011/118347 A1 | 9/2011 |

OTHER PUBLICATIONS

Office Action dated Dec. 21, 2017, in Japanese Patent Application No. 2014-120249.
Decision of Refusal dated Jul. 3, 2018, in Japanese Patent Application No. 2014-120249.

\* cited by examiner

FRICTION PLATE AND WET MULTIPLE-PLATE CLUTCH WITH FRICTION PLATE

BACKGROUND OF THE INVENTION

Field of the Invention

The present invention relates to a friction plate used in a hermetically sealed oil reservoir environment, such as inside a torque converter for an automatic transmission, and a wet multiple-plate clutch provided with the friction plate. The present invention relates, more specifically, to a friction plate which exhibits high heat resistance and high durability during slip control in a hermetically sealed oil reservoir environment, and a wet multiple-plate clutch provided with the friction plate.

Description of the Related Art

In general, a wet multiple-plate clutch has friction plates and separator plates, which are alternately disposed between the drum and the hub of a clutch or a brake, and the clutch is engaged and disengaged by pressing and releasing a clutch piston.

When using the foregoing wet multiple-plate clutch in a hermetically sealed oil reservoir environment, there are some cases where the wet multiple-plate clutch is used in a certain slip state until engaged.

Especially in the case of a lockup clutch for a torque converter for an automatic transmission, the slip control is essential for satisfying the demand for improved fuel economy. Recent years are witnessing the demand for a friction plate that permits the slip control.

The use in a hermetically sealed oil reservoir environment causes considerable damage to the friction member of the friction plates of the wet multiple-plate clutch. Hence, cooling the friction plates to reduce the damage due to heat accumulation is a challenge to be addressed.

According to a technique generally used to suppress the influence of heat accumulation thereby to enhance cooling performance, the friction member of a clutch is provided with a groove to enhance oil draining performance thereby to improve the cooling performance. This technique, however, poses a problem in that the contact (internal pressure) with a mating surface increases with a resultant increased dragging torque. If a groove opened on an inner diameter side, as described in Japanese Patent Application Laid-Open No. 2007-51759, is used to reduce the dragging torque, then the area of a friction member reduces, posing a problem of a lower tolerance of heat resistance.

Further, the demand for improved fuel economy for vehicles is ever increasing in recent years. In order to reduce a power loss at the time of disengaging a clutch, achieving a further reduction in the dragging torque between a friction plate and a separator plate has been increasingly called for. Hence, there has been a demand for a friction plate capable of cooling the friction members thereof while reducing the dragging torque, and a wet multiple-plate clutch that uses the friction plate.

SUMMARY OF THE INVENTION

Accordingly, an object of the present invention is to provide a friction plate of a wet multiple-plate clutch which is used in a hermetically sealed oil reservoir environment and which has improved oil draining performance that improves performance for cooling friction members.

To this end, a friction plate in accordance with the present invention includes:

a plurality of friction material segments circularly fixed to a substantially annular core plate, wherein a through groove that penetrates from an inside diameter side to an outside diameter side of the core plate is formed between the friction material segments, and each of the friction material segments has a circumferential groove that opens to the through groove, extends in a circumferential direction, and terminates in the friction material segment.

The present invention provides advantages described below.

The circumferential groove that extends in the circumferential direction accelerates oil drainage, so that oil draining performance improves with resultant enhanced cooling performance. This makes it possible to reduce damage to the friction members caused by heat accumulation.

The oil that overflows from the circumferential groove moves in an axial direction, causing a pressure to be generated on a friction surface. This provides a separating effect, which reduces a dragging torque.

Further, the circumferential groove can be formed in a small area, so that a large area can be saved for the friction members. Hence, both higher resistance to heat and the separating effect can be achieved.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The term "circumferential groove" in the present specification generally refers to a groove that extends in the circumferential direction of a core plate, but also includes a groove that extends in a direction at an angle relative to the circumferential direction. The term "hermetically sealed oil reservoir environment" refers to an environment in which no oil is supplied from outside and a large amount of oil circulates in an oil-tight structure, as in the case of, for example, a torque converter. The term may be used for other applications than a torque converter insofar as they are oil-tight.

The following will describe the present invention in detail with reference to the accompanying drawings. In the drawings, the same components are denoted by the same reference numerals.

Figure 1:
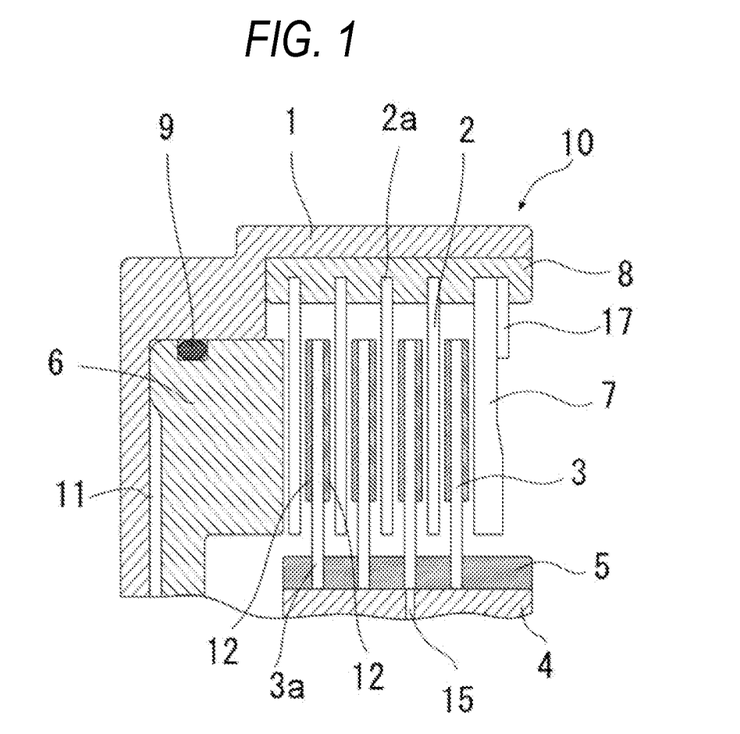
FIG. 1 is a partial sectional view in the axial direction of a wet multiple-plate clutch provided with friction plates in accordance with the present invention.

FIG. 1 is a partial sectional view in the axial direction of a wet multiple-plate clutch 10 provided with friction plates in accordance with the present invention.

The wet multiple-plate clutch 10 is constituted of a substantially cylindrical clutch drum 1, which is open at one end in an axial direction, a hub 4, which is disposed on the inner periphery of the clutch drum 1 and which coaxially and relatively rotates, annular separator plates 2, which are disposed on a spline 8 movably in the axial direction, the spline 8 being provided on the inner periphery of the clutch drum 1, and annular friction plates 3, each of which is disposed on a spline 5, which is provided on the outer periphery of the hub 4, alternately with the separator plates 2 in the axial direction, and both surfaces of which in the axial direction have friction surfaces to which friction material segments are fixed with an adhesive agent. Each of the separator plates 2 has a spline portion 2a, which engages with the spline 8, and each of the friction plates 3 has a spline portion 3a, which engages with the spline 5. There are provided a plurality of the friction plates 3 and a plurality of the separator plates 2.

The wet multiple-plate clutch 10 is provided with a piston 6, which pushes and fastens the separator plates 2 and the friction plates 3, and a backing plate 7 and a stopper ring 17 retaining the backing plate 7, which are provided on the inner periphery of the clutch drum 1 to retain the separator plates 2 and the friction plates 3 in a fixed state at one end in the axial direction.

As illustrated in FIG. 1, the piston 6 is disposed such that it is slidable in the axial direction at the closed end of the clutch drum 1. An O-ring 9 is interposed between the outer circumferential surface of the piston 6 and the inner surface of the clutch drum 1. Further, a sealing member (not illustrated) is interposed between the inner circumferential surface of the piston 6 and the outer circumferential surface of the inner circumferential cylindrical portion (not illustrated) of the clutch drum 1. Thus, a hydraulic chamber 11 in an oil-tight state is defined between the inner surface at the closed end of the clutch drum 1 and the piston 6.

Friction material segments 12 and 13, which have predetermined friction coefficients, are fixed to both surfaces of each of the friction plates 3, which are retained by the hub 4 such that they are slidable in the axial direction. Alternatively, however, the friction material segments 12 and 13 may be provided on only one side of the friction plate 3. Further, the hub 4 has a lubricant supply port 15, which penetrates in the radial direction. Through the lubricant supply port 15, a lubricant is supplied from the inside diameter side to the outside diameter side of the wet multiple-plate clutch 10.

The wet multiple-plate clutch 10 having the foregoing construction engages (fastens) and disengages a clutch as described below. FIG. 1 illustrates a state in which the clutch has been disengaged, the separator plates 2 and the friction plates 3 being separated. In the disengaged state, the piston 6 is in contact with the closed end of the clutch drum 1 due to the urging force of a return spring (not illustrated).

In order to engage the wet multiple-plate clutch 10 in the disengaged state, an oil pressure is supplied to the hydraulic chamber 11 defined between the piston 6 and the clutch drum 1. As the oil pressure increases, the piston 6 moves to the right in the axial direction in FIG. 1 against the urging force of the return spring (not illustrated), bringing the separator plates 2 and the friction plates 3 into close contact with each other. Thus, the wet multiple-plate clutch 10 is engaged.

In order to disengage the wet multiple-plate clutch 10 again after the wet multiple-plate clutch 10 is set to the engaged state, the oil pressure to the hydraulic chamber 11 is released. Upon releasing the oil pressure, the urging force of the return spring (not illustrated) causes the piston 6 to move to the position where the piston 6 comes in contact with the closed end of the clutch drum 1. Thus, the wet multiple-plate clutch 10 is disengaged.

First Embodiment

Figure 2:
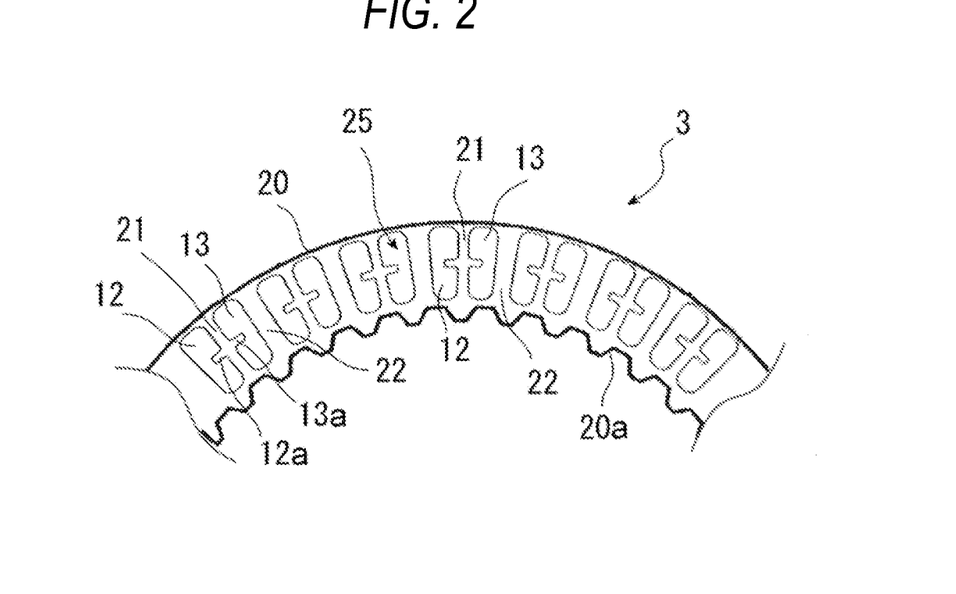
FIG. 2 is a partial front view of one of the friction plates illustrating a first embodiment of the present invention.

FIG. 2 is a partial front view of a friction plate 3, which illustrates a first embodiment of the present invention. The friction plate 3 has a friction surface 25 formed by circularly fixing friction material segments 12 and 13 to a substantially annular core plate 20 by an adhesive agent or the like. The core plate 20 has, on the inner periphery thereof, a spline 20a that engages with a spline 5 of a hub 4.

As illustrated in FIG. 2, each of the friction plates 3 has successive pairs of the friction material segments 12 and 13 arranged circumferentially. Through grooves 21 and 22, which penetrate from the inside diameter side to the outside diameter side of the core plate 20 and radially extend, are formed between the friction material segments 12 and 13.

The friction material segments 12 and 13 have circumferential grooves 12a and 13a, respectively, which open to the through groove 21, extend in the circumferential direction, and end in the friction material segments. The circumferential grooves 12a and 13a are symmetrically provided substantially at the middle in the radial direction of the friction material segments. Further, the circumferential grooves 12a and 13a are symmetrically provided relative to the through groove 21, opposing each other with the through groove 21 lying therebetween, and are disposed in alignment in the radial direction.

The circumferential groove 12a of the friction material segment 12 opens to the through groove 21 and terminates and closes in the friction material segment 12 in the circumferential direction. Similarly, the circumferential groove 13a of the friction material segment 13 opens to the through groove 21 and terminates and closes in the friction material segment 13 in the circumferential direction.

The circumferential groove 12a of the friction material segment 12 is provided at one end portion of the friction material segment 12 in the circumferential direction and not provided at the other end portion thereof. Similarly, the circumferential groove 13a of the friction material segment 13 is provided at one end portion of the friction material segment 13 in the circumferential direction and not provided at the other end portion thereof. The another through groove 22 is formed in the area with no circumferential groove between the friction material segment 12 and the friction material segment 13.

As described above, in the first embodiment, pairs of friction material segments 12 and 13 are circularly arranged, and the through grooves 21 in communication with the circumferential grooves 12a and 13a and the through grooves 22 not in communication therewith are alternately arranged. The circumferential grooves 12a and the circumferential grooves 13a are formed at the middle in the radial direction of the friction material segments 12 and 13, respectively; alternatively, however, the circumferential grooves 12a and 13a may be formed at different positions insofar as they are formed in alignment in the radial direction.

FIG. 2 is a partial front view of the friction plate 3 obtained by fixing the friction material segments 12 and 13, which have the constructions according to the first embodiment, to the annular core plate 20. Whereas the drawing presents a simplified view for the sake of convenience of explanation, it is needless to mention that the friction plate 3 is annular and the friction material segments 12 and 13 are circularly arranged in exactly the same fashion in the unillustrated portion.

Figure 3:
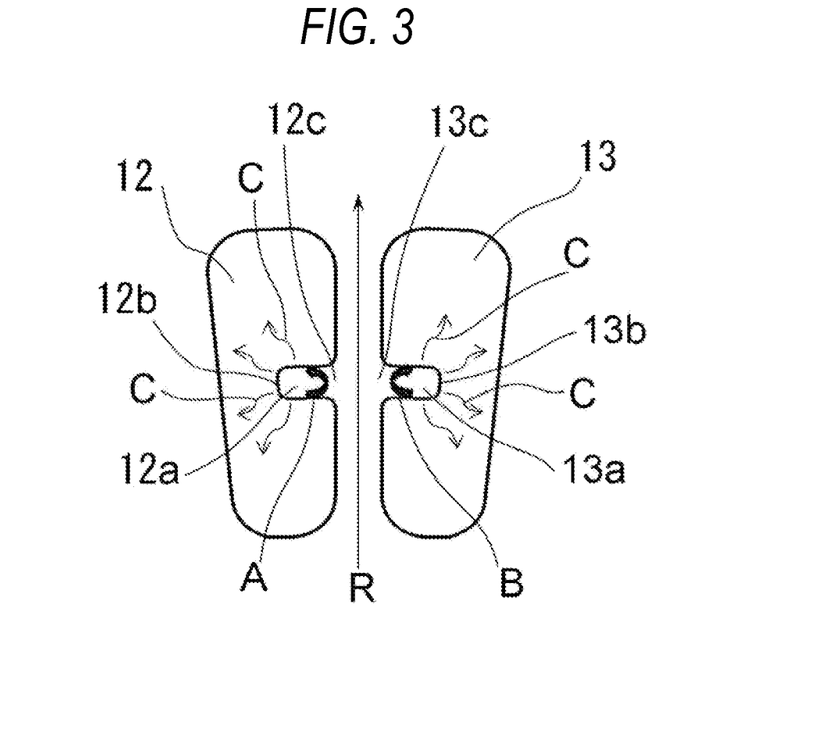
FIG. 3 is a front view illustrating friction material segments according to the first embodiment of the present invention.

FIG. 3 is a front view of the friction material segments according to the first embodiment of the present invention, and used to describe the function of the circumferential grooves provided in the friction material segments. As described above, a pair of the adjoining friction material segments 12 and 13 are provided with the circumferential grooves 12a and 13a that oppose each other with the through groove 21 lying therebetween.

The friction material segments 12 and 13 paired as illustrated are fixed to the core plate 20 by being circularly and evenly arranged in the circumferential direction. The same will apply to a second embodiment to a sixth embodiment, which will be discussed hereinafter.

The circumferential groove 12a has an open portion 12c that opens to the through groove 21 and an end portion 12b that terminates in the friction material segment 12. Similarly, the circumferential groove 13a has an open portion 13c that opens to the through groove 21 and an end portion 13b that terminates in the friction material segment 13. As illustrated in FIG. 3, the open portion 12c of the circumferential groove 12a and the open portion 13c of the circumferential groove 13a oppose each other in the circumferential direction, sandwiching the through groove 21 therebetween.

The functions of the circumferential grooves will now be described. As illustrated in FIG. 3, a part of the lubricant supplied from the inside diameter direction to the friction plate 3 mainly through the lubricant supply port 15 of the hub 4 retaining the friction plate 3 flows toward the outside diameter side through the through grooves 21 and 22 that pass through a clutch section, the flow being illustrated by an arrow R. The oil passing through the through grooves 21 and 22 functions not only as a lubricant but also functions as a cooling material that reduces the heat accumulating on the frictionally engaged surface between the friction plate 3 and separator plate 2.

The oil in the through groove 21 flows from the inside diameter side to the outside diameter as indicated by the arrow R. At this time, the oil that has entered the circumferential grooves 12a and 13a from the through groove 21 rotates in the circumferential grooves as indicated by arrows A and B, respectively. The rotational energy of the rotating oil is transmitted to the oil passing through the through groove 21, thus accelerating the flow rate of the oil passing through the through groove 21. As a result, the capability of draining the oil in the through groove 21 into the outside diameter direction is improved. This improves the capability of cooling the clutch section composed of the friction plates 3, the separator plates 2 and the like.

The foregoing improved capability of cooling makes it possible to reduce the damage to the friction material segments 12 and 13 caused by heat accumulation. Further, the dragging torque can be reduced by the separating effect rendered by the oil that flows in the axial direction after entering the circumferential grooves 12a and 13a and then rides onto the friction surfaces 25 as indicated by a plurality of arrows C illustrated in FIG. 3. In addition, the circumferential grooves can be formed in a small area, so that a large area can be saved for the friction surfaces 25. This improves heat resistance of the friction members and also provides the separating effect.

Obviously, the circumferential grooves in the second embodiment to the sixth embodiment, which will be discussed hereinafter, also function to accelerate the flow rate of the oil in the through groove, as with the circumferential grooves described with reference to FIG. 3.

Second Embodiment

Figure 4:
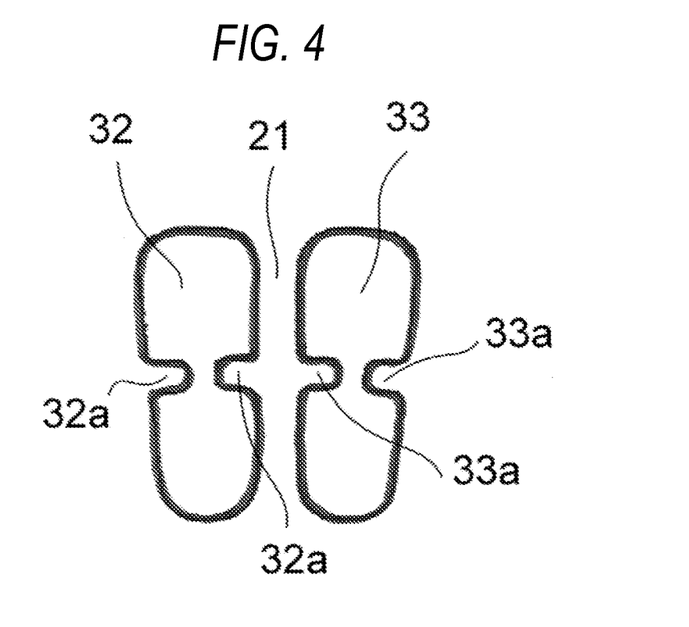
FIG. 4 is a front view illustrating friction material segments according to a second embodiment of the present invention.

FIG. 4 is a front view of friction material segments illustrating a second embodiment of the present invention. Paired friction material segments 32 and 33 have the same shape. The friction material segment 32 is provided with circumferential grooves 32a at both end portions in the circumferential direction. Similarly, the friction material segment 33 is provided with circumferential grooves 33a at both end portions in the circumferential direction. In the present embodiment, a single friction material segment is provided with two circumferential grooves formed in alignment in the radial direction. The circumferential grooves 32a and 33a are provided substantially at the middle in the radial direction of the friction material segments. The circumferential grooves 32a and 33a are symmetrically provided relative to a through groove 21.

According to the second embodiment, the oil that flows through all of the through grooves 21, each of which lies between the friction material segment 32 and the friction material segment 33, and the through grooves 22 can be accelerated. Therefore, the cooling efficiency is higher than that in the first embodiment, making it possible to more effectively restrain the damage to the friction material segments caused by accumulated heat.

Third Embodiment

Figure 5:
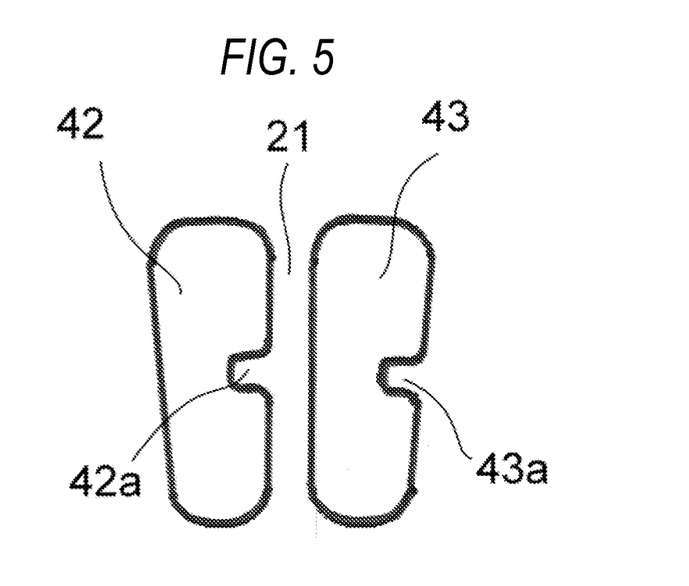
FIG. 5 is a front view illustrating friction material segments according to a third embodiment of the present invention.

FIG. 5 is a front view of friction material segments illustrating a third embodiment of the present invention. Paired friction material segments 42 and 43 have the same shape. The friction material segment 42 has a circumferential groove 42a at one end portion in the circumferential direction. Similarly, the friction material segment 43 has a circumferential groove 43a at one end portion in the circumferential direction. As illustrated in FIG. 5, the circumferential groove 42a and the circumferential groove 43a open in the same direction. The circumferential grooves 42a and 43a are provided substantially at the middle in the radial direction of the friction material segments. However, the circumferential grooves 42a and 43a are provided asymmetrically with respect to a through groove 21.

According to the third embodiment, as with the second embodiment, the oil that flows through all of the through grooves 21, each of which lies between the friction material segment 42 and the friction material segment 43, and the through grooves 22 can be accelerated. One circumferential groove is provided for each through groove, making it possible to obtain advantages close to those of the first embodiment.

Fourth Embodiment

Figure 6:
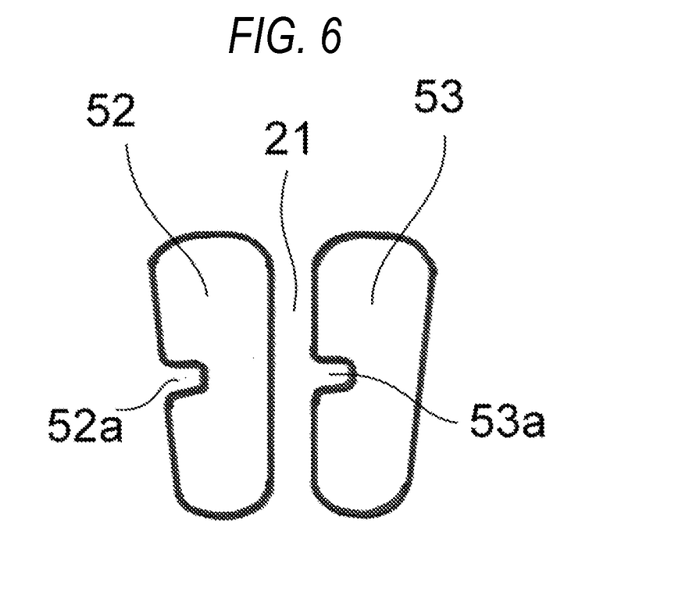
FIG. 6 is a front view illustrating friction material segments according to a fourth embodiment of the present invention.

FIG. 6 is a front view of friction material segments illustrating a fourth embodiment of the present invention. Paired friction material segments 52 and 53 have the same shape. The friction material segment 52 has a circumferential groove 52a at one end portion in the circumferential direction. Similarly, the friction material segment 53 has a circumferential groove 53a at one end portion in the circumferential direction. As illustrated in FIG. 6, the circumferential groove 52a and the circumferential groove 53a open in the same direction, which direction is the opposite circumferential direction from that of the circumferential grooves in the third embodiment. The circumferential grooves 52a and 53a are provided substantially at the middle in the radial direction of the friction material segments. However, the circumferential grooves 52a and 53a are provided asymmetrically with respect to a through groove 21.

According to the fourth embodiment, as with the second embodiment, the oil that flows through all of the through grooves 21, each of which lies between the friction material segment 52 and the friction material segment 53, and the through grooves 22 can be accelerated. One circumferential groove is provided for each through groove, making it possible to obtain advantages close to those of the first embodiment.

Fifth Embodiment

Figure 7:
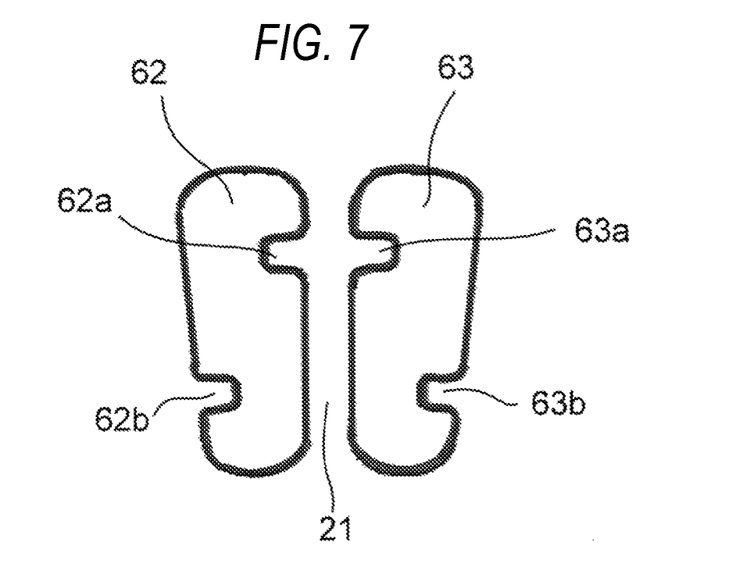
FIG. 7 is a front view illustrating friction material segments according to a fifth embodiment of the present invention.

FIG. 7 is a front view of friction material segments illustrating a fifth embodiment of the present invention. As with the second embodiment, each of paired friction material segments 62 and 63 has two circumferential grooves formed at both end portions in the circumferential direction. However, the positions of the two circumferential grooves in the radial direction are different.

In the friction material segment 62, a circumferential groove 62a is formed at one end portion in the circumferential direction and closer to the outside diameter, and a circumferential groove 62b is formed at the other end portion closer to the inside diameter. Meanwhile, in the friction material segment 63, a circumferential groove 63a is formed at one end portion in the circumferential direction and closer to the outside diameter, and a circumferential groove 63b is formed at the other end portion closer to the inside diameter. The circumferential grooves 62a and 63a are provided asymmetrically with respect to a through groove 21.

The circumferential groove 62a and the circumferential groove 63a are closer to the outside diameter and oppose each other in alignment in the radial direction, sandwiching the through groove 21 therebetween. Further, the circumferential groove 62b and the circumferential groove 63b are closer to the inside diameter and oppose each other in alignment in the radial direction, sandwiching a through groove 22 therebetween, the through groove 22 being not illustrated in FIG. 7.

As with the second embodiment, the fifth embodiment makes it possible to accelerate the oil that flows through all of the through grooves 21, each of which lies between the friction material segment 62 and the friction material segment 63, and the through grooves 22. Therefore, the cooling efficiency is higher than that in the first embodiment and the damage to the friction material segments due to heat accumulation can be restrained more effectively.

Sixth Embodiment

Figure 8:
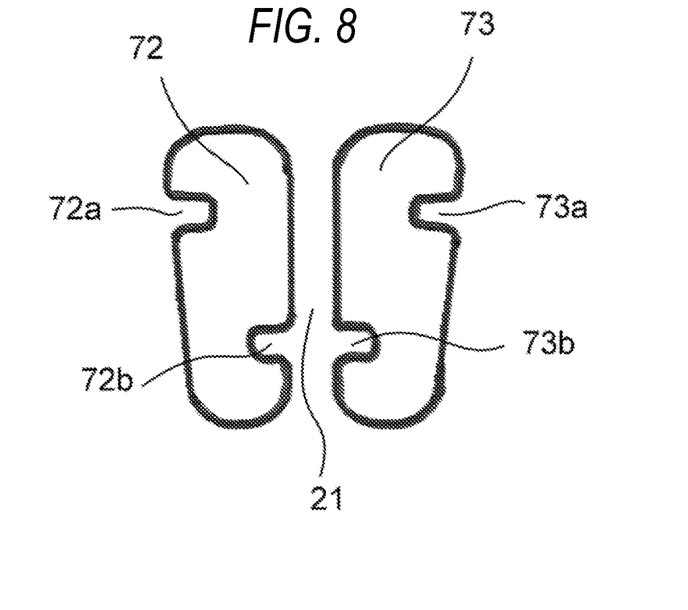
FIG. 8 is a front view illustrating friction material segments according to a sixth embodiment of the present invention.

FIG. 8 is a front view of friction material segments illustrating a sixth embodiment of the present invention. As with the second embodiment, each of paired friction material segments 72 and 73 has two circumferential grooves formed at both end portions in the circumferential direction. However, the positions of the two circumferential grooves in the radial direction are different. Circumferential grooves 72a and 73a are provided asymmetrically with respect to a through groove 21.

In the friction material segment 72, the circumferential groove 72a is formed at one end portion in the circumferential direction and closer to the outside diameter, and a circumferential groove 72b is formed at the other end portion closer to the inside diameter. Meanwhile, in the friction material segment 73, the circumferential groove 73a is formed at one end portion in the circumferential direction and closer to the outside diameter, and a circumferential groove 73b is formed at the other end portion closer to the inside diameter.

The circumferential groove 72b and the circumferential groove 73b are closer to the inside diameter and oppose each other in alignment in the radial direction, sandwiching a through groove 21 therebetween. Further, the circumferential groove 72a and the circumferential groove 73a are closer to the outside diameter and oppose each other in alignment in the radial direction, sandwiching a through groove 22 therebetween, the through groove 22 being not illustrated in FIG. 8.

As with the second embodiment, the sixth embodiment makes it possible to accelerate the oil that flows through all of the through grooves 21, each of which lies between the friction material segment 72 and the friction material segment 73, and the through grooves 22. Therefore, the cooling efficiency is higher than that in the first embodiment and the damage to the friction material segments due to heat accumulation can be restrained more effectively.

If the through grooves 21 and the through grooves are formed to have exactly the same shape, then the fifth embodiment and the sixth embodiment will have substantially the same configuration when the friction material segments are circularly arranged.

In the embodiments described above, each of the circumferential grooves in the first to the fourth embodiments is provided substantially at the middle in the radial direction of each of the friction material segments. However, the circumferential grooves may be provided at other positions. Further, a plurality of circumferential grooves could be provided in the radial direction at one end portion of the friction material segment. This, however, would lead to a reduced area of the friction material segment, i.e. a reduced area of a friction surface, so that a minimum number of circumferential grooves is preferably provided.

Features common to the described embodiments are apparent from the showing of those embodiments in the drawings. More particularly, as shown in FIGS. 3-8, each friction material segment is elongated radially so that its length, disposed in the radial direction, is greater than its width in the circumferential direction. Each friction material segment has at least one circumferential groove that is spaced radially from opposite ends of the friction material segment. The circumferential length of each circumferential groove is greater than the radial width of the circumferential groove, and the radial width of the circumferential groove is substantially the same along the circumferential length of the circumferential groove from an open end to a closed end of the circumferential groove, and each of the friction material segments is convexly curved at opposite ends of each of its longitudinal sides.

The friction material segments are attached by applying an adhesive agent to the core plate 20. Alternatively, however, sticker-type friction material segments with an adhesive agent applied to the back sides thereof may be placed on the core plate 20 and heated under pressure thereby to attach the friction material segments.

Figure 9:
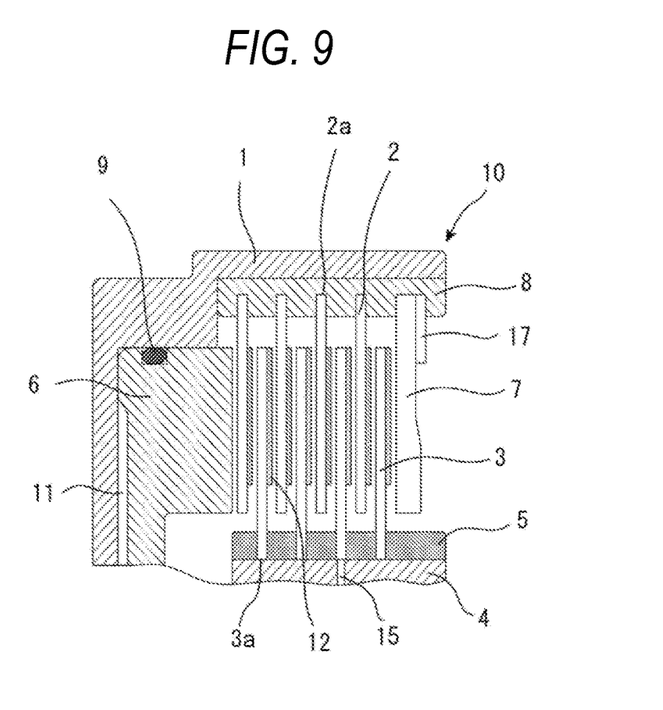
FIG. 9 is a partial sectional view in the axial direction of a wet multiple-plate clutch provided with another type of friction plates in accordance with the present invention.

FIG. 9 is a partial sectional view in the axial direction of a wet multiple-plate clutch provided with another type of friction plates in accordance with the present invention. Unlike the friction plates 3 illustrated in FIG. 1, each of friction plates 3 illustrated in FIG. 9 has a friction material segment 12 fixed to only one surface thereof in the axial direction. Meanwhile, the friction material segment 12 is fixed to a surface in the axial direction of a separator plate 2 opposing the surface of the friction plate 3 that does not have the friction material segment 12 fixed thereto. In the above description, the friction material segments 12 represent the friction material segments; however, other friction material segments 13, 32, 33, 42, 43, 52, 53, 62, 63, 72 and 73 can be applied in the same manner.

Figure 10:
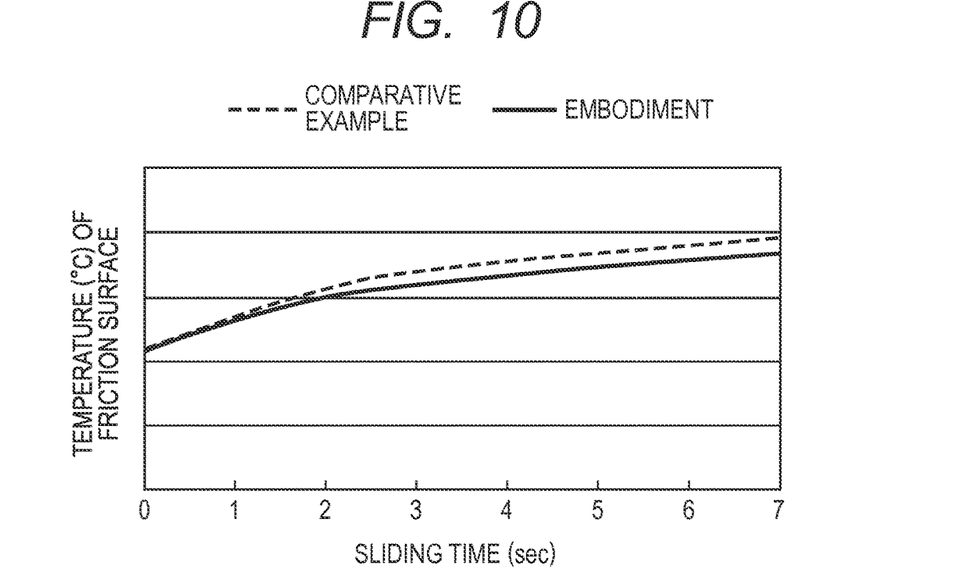
FIG. 10 is a graph illustrating a relationship between slide time (sec) and friction surface temperature (° C.) in the friction plates according to the first embodiment of the present invention and those in a comparative example.

FIG. 10 is a graph illustrating the relationship between slide time (sec) and friction surface temperature (° C.) in the friction plate of the first embodiment of the present invention and that of a comparative example (a conventional example). It is seen that the temperature of a friction surface remains lower in the friction plate provided with the circumferential grooves in the embodiment of the present invention than that in the comparative example provided with no circumferential grooves.

Figure 11:
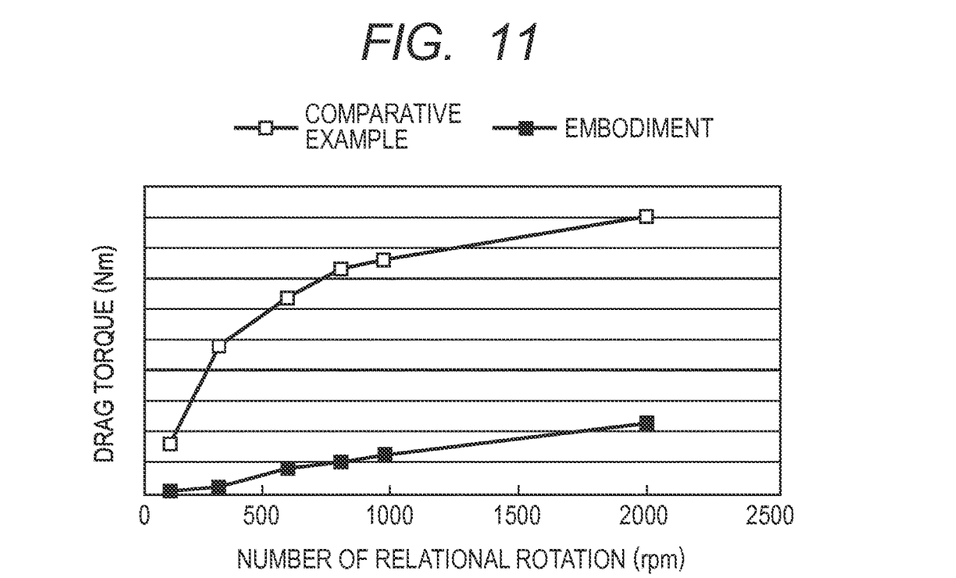
FIG. 11 is a graph illustrating a relationship between relative rotation speed (rpm) and dragging torque (Nm) in the friction plates according to the first embodiment of the present invention and those in the comparative example.

FIG. 11 is a graph illustrating a relationship between a relative rotation speed (rpm) and a dragging torque (Nm) in the friction plate of the first embodiment of the present invention and that of the comparative example (the conventional example). It is seen that the dragging torque remains lower in the friction plate provided with the circumferential grooves in the embodiment of the present invention than that in the comparative example provided with no circumferential grooves. Especially in a rotation speed range exceeding 1000 rpm, the dragging torque remains significantly lower than that in the conventional example.

In the graphs of FIG. 10 and FIG. 11, the "embodiment" corresponds to the friction plate according to the first embodiment of the present invention illustrated in FIG. 2, and the "comparative example" corresponds to a friction plate in the case where the friction material segments in FIG. 2 are not provided with the circumferential grooves.

As described above, the present invention ideally suited for the use in a hermetically sealed oil reservoir environment can be used in, for example, a lockup clutch in a torque converter or a vehicle in which an automatic transmission is mounted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-120249, filed Jun. 11, 2014, which is hereby incorporated by reference herein in its entirety.

What is claimed is:

1. A friction plate comprising:
a plurality of friction material segments fixed to a surface of a substantially annular core plate in a circular arrangement, each friction material segment being elongated radially so that its length, disposed in a radial direction, is greater than its width in a circumferential direction,
wherein a through groove that penetrates from an inside diameter side to an outside diameter side of the core plate is formed between each of adjacent friction material segments, and each of the friction material segments has circumferential groove that is spaced radially from opposite ends of the friction material segment, that opens to the through groove, that extends in the circumferential direction and that terminates in the friction material segment,
wherein a circumferential length of each circumferential groove is greater than a radial width of the circumferential groove, and the radial width of each circumferential groove is substantially the same along the circumferential length of the circumferential groove from an open end to a closed end of the circumferential groove,
wherein the circumferential grooves are formed at both of end portions of the friction material segments in the circumferential direction,
wherein the circumferential grooves at both end portions are disposed at different positions in the radial direction and
such that oil passes through the through grooves and rotation movement of the oil entering the circumferential grooves and rotating in the circumferential grooves accelerates the flow rate of the oil passing through the through grooves, and the rotating oil rides onto a friction surface of the friction material segments.

2. The friction plate according to claim 1, wherein the circumferential grooves of adjacent friction material segments oppose each other, sandwiching one of the through grooves therebetween.

3. The friction plate according to claim 2, wherein the opposing circumferential grooves are disposed at same positions in the radial direction.

4. The friction plate according to claim 1, wherein a plurality of the circumferential grooves is provided at end portions in the circumferential direction of the friction material segments.

5. The friction plate according to claim 1, wherein the friction plate is enclosed in a hermetically sealed oil reservoir environment.

6. A wet multiple-plate clutch comprising a plurality of friction plates according to claim 1 and a plurality of separator plates disposed alternately with the friction plates in an axial direction.

7. The wet multiple-plate clutch according to claim 6, wherein each friction plate has the friction material segments fixed to one surface thereof in the axial direction.

8. The wet multiple-plate clutch according to claim 6, wherein each friction plate has friction material segments fixed to both of opposite surfaces thereof in the axial direction.

9. The friction plate according to claim 1, wherein the friction material segments are arranged circumferentially in successive pairs.

10. The friction plate according to claim 9, wherein the friction material segments of each pair have circumferential grooves that open to a same one of the through grooves.

11. The friction plate according to claim 9, wherein the friction material segments of each pair have circumferential grooves that open to different through grooves.

12. The friction plate according to claim 9, wherein the friction material segments of each pair have circumferential grooves that open to a plurality of the through grooves.

\* \* \* \* \*